(12) United States Patent
Sasabata et al.

(10) Patent No.: US 6,292,067 B1
(45) Date of Patent: Sep. 18, 2001

(54) ASK MODULATOR AND COMMUNICATION DEVICE USING THE SAME

(75) Inventors: Akihiro Sasabata; Shigekazu Okamoto; Motoyasu Nakao, all of Nagaokakyo (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/560,088

(22) Filed: Apr. 28, 2000

(30) Foreign Application Priority Data

Apr. 28, 1999  (JP) .................................................. 11-122509

(51) Int. Cl.[7] .............................. H03C 1/36; H03C 1/38; H04L 27/04
(52) U.S. Cl. ......................... 332/115; 332/106; 332/116; 332/149; 332/178; 375/295; 375/300
(58) Field of Search ..................... 332/106, 107, 332/115, 116, 149, 178; 375/295, 296, 300, 301

(56) References Cited

U.S. PATENT DOCUMENTS 5,680,078 * 10/1997  Ariie ..................................... 332/178
6,087,904 *  7/2000  Wen ...................................... 332/178
6,194,978 *  2/2001  Romano ............................... 332/107

FOREIGN PATENT DOCUMENTS 0977408     2/2000  (EP) .

* cited by examiner

Primary Examiner—David Mis
(74) Attorney, Agent, or Firm—Ostrolenk, Faber, Gerb & Soffen, LLP

(57) ABSTRACT

An ASK modulator can be operated with only a positive-voltage power source. A source-voltage switching circuit that applies a positive voltage to the source of a FET when a data signal is at an L level in relation to the source of the FET is connected to the source of the FET which has a negative pinch-off voltage. Since the L level of the data signal can be set to 0 V, the ASK modulator can be configured only with the positive-voltage power source. This allows miniaturization and cost reduction to be implemented.

9 Claims, 4 Drawing Sheets

ASK MODULATOR AND COMMUNICATION DEVICE USING THE SAME

BACKGROUND OF THE INVENTION

1. Field of the Invention

The present invention relates to an ASK modulator; particularly, the invention relates to an ASK modulator used for an electronic toll collection (ETC) system.

2. Description of the Related Art

FIG. 5 shows a conventional amplitude shift keying (ASK) modulator. In an ASK modulator 1 shown in FIG. 5, the drain of a field effect transistor 2 (FET 2) having a negative pinch-off voltage of −1 V is connected to a power-source terminal 4 via an inductor 3. The drain is also connected to a modulation-signal output terminal 6 via a capacitor 5. A positive voltage is applied to the power-source terminal 4. The source of the FET 2 is grounded via a resistor 7 and a capacitor 8 connected in parallel. The gate of FET 2 is connected to a carrier-signal input terminal 9. A data-signal input terminal 10 is grounded via resistors 11 and 12 which are connected in series, and a node where the resistors 11 and 12 are connected is connected to the gate of the FET 2.

FIGS. 6A–6C show waveforms of signals that are inputted to the carrier-signal input terminal 9 and the data-signal input terminal 10 and a signal that is outputted from the modulation-signal output terminal 6. Referring to these waveforms, the operation of the ASK modulator 1 is described below. The amplitudes of the individual signals in the figures are not necessarily drawn to scale. As an example, for reference, the amplitude of the carrier signal may be smaller than that of the data signal, and the amplitude of the modulation signal may be greater than that of the carrier signal.

First, a carrier signal with a sine waveform as shown in FIG. 6A is inputted to the carrier-signal input terminal 9. On the other hand, a digital data signal as shown in FIG. 6B is inputted to the data-signal input terminal 10. The potential of the data signal is assumed to be 0 V at a high (H) level, and is assumed to be −5 V at a low (L) level. As a result, the data signal with the carrier signal overlapped is inputted to the gate of the FET 2.

When the data signal is at the H level, the voltage between the gate and the source of the FET 2 is higher than the pinch-off voltage, thereby causing the FET 2 to perform an amplifying operation. The carrier signal is thus amplified, and the amplified signal is outputted from the modulation-signal output terminal 6. In contrast, when the data signal is at the L level, since the voltage between the gate and the source of the FET 2 is lower, the FET 2 does not perform the amplifying operation. Therefore, the modulation-signal output terminal 6 outputs no signal.

Thus, as shown in FIG. 6C, depending on the condition, the modulation-signal output terminal 6 either outputs the carrier signal amplified in relation to the data signal or does not output any signal. It is apparent that this is attributable to ASK-modulation (amplitude modulation) wherein the data signal digitally modulates the carrier signal. In this way, the ASK modulator 1 implements the ASK-modulation operation.

With the ASK modulator 1, to perform the modulation operation, however, at least an L-level potential of the data signal must be the same as or lower than the pinch-off voltage of the FET 2, that is, it must be a negative potential. This requires a negative-voltage power source for supplying the negative potential, in addition to the power source for supplying the positive voltage that is applied to the power-source terminal 4. This produces problems in that the provision of the additional negative power source makes it difficult to implement miniaturization of the ASK modulator 1 and of a module using it, and makes cost reduction difficult as well.

SUMMARY OF THE INVENTION

In view of the above problems, the present invention provides an ASK modulator that can be operated with only a positive-voltage power source and a communication device using it.

To achieve the object, according to one aspect of the present invention, an ASK modulator of the present invention comprises a field effect transistor (FET) having a negative pinch-off voltage, a carrier-signal input terminal and a data-signal input terminal that are connected to the gate of the FET, a modulation-signal output terminal connected to the drain of the FET, a resistor connected between the source and the ground, and a source-voltage switching circuit that is connected to the source of the FET and applies a positive voltage to the source of the FET when the data signal is at an L level. The operation of the source-voltage switching circuit is associated with the data signal inputted to the data-signal input terminal. In the described ASK modulator, the source-voltage switching circuit may comprise a positive-voltage power source and a second resistor connected between the positive-voltage power source and the source of the FET.

According to another aspect of the invention, a communication device of the present invention uses the above-described ASK modulator.

According to the described ASK modulator of the present invention, a modulating operation can be implemented without using a negative-voltage power source. The ASK modulator is configured such that a the gate of a FET having a negative pinch-off voltage is connected to a carrier-signal input terminal and a data-signal input terminal, the drain is connected to a modulation-signal output terminal, and the source is grounded via a resistor and is connected to a source-voltage switching circuit that applies a positive voltage to the source of the FET when the data signal is at an L level. The operation of the source-voltage switching circuit is associated with the data signal inputted to the data-signal input terminal. Accordingly, miniaturization and cost reductions can be implemented for the ASK modulator and a module having such an ASK modulator.

Also, the configuration of the source-voltage switching circuit can be significantly simplified by using the positive-voltage power source, and a second resistor connected between the positive-voltage power source and the source of the FET. This allows further dimensional and cost reductions to be achieved.

Furthermore, since the communication device of the present invention uses the ASK modulator of the present invention, miniaturization and cost reduction can be implemented.

Other features and advantages of the present invention will become apparent from the following description of embodiments of the invention which refers to the accompanying drawings.

DESCRIPTION OF EMBODIMENTS OF THE INVENTION

Figure 1:
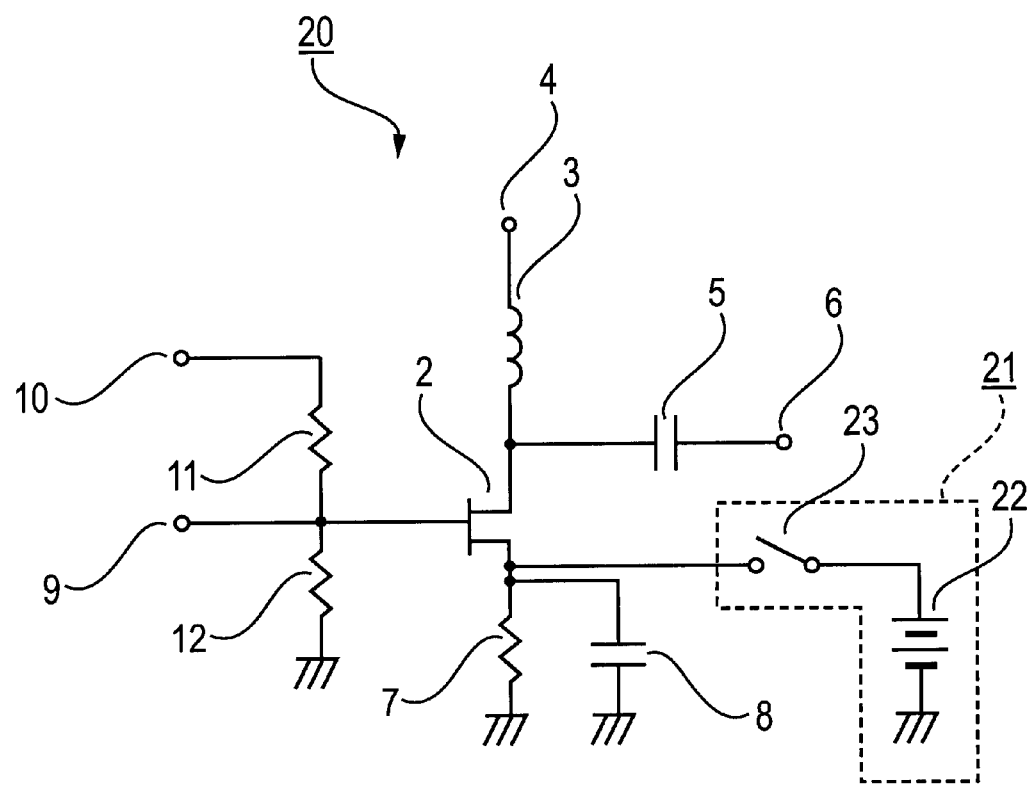
FIG. 1 is a circuit diagram showing an example of an ASK modulator according to the present invention.
Figure 5:
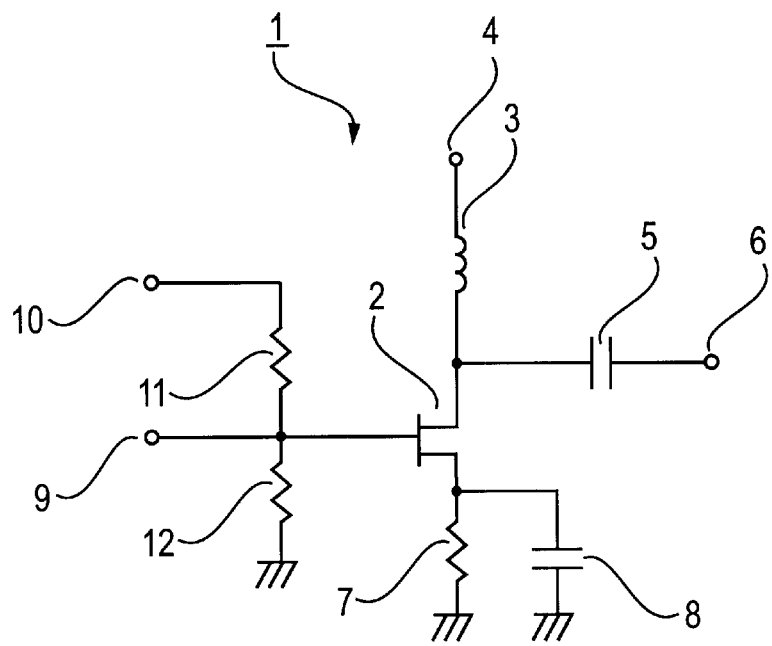
FIG. 5 is a circuit diagram showing a conventional ASK modulator.
Figure 6A:
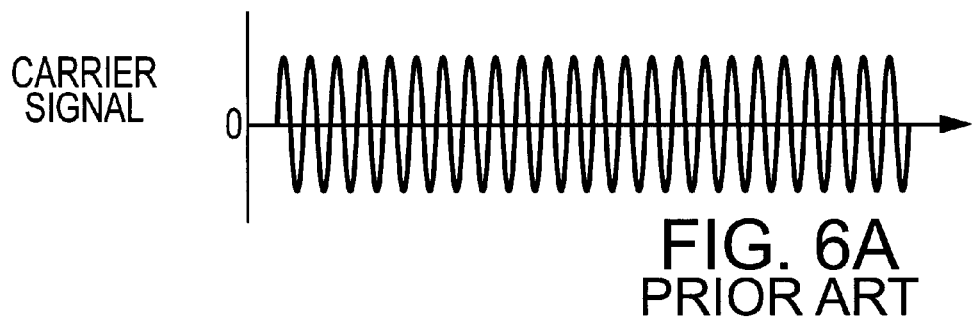
FIG. 6A shows a waveform of a carrier signal that is inputted to the ASK modulator in FIG. 5.
Figure 6B:
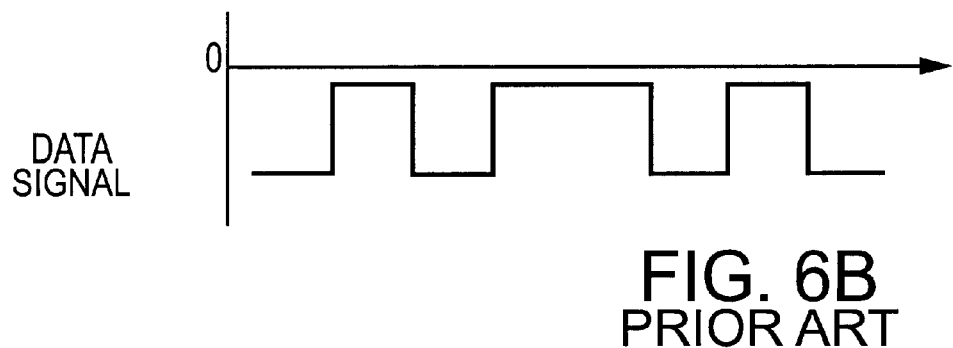
FIG. 6B shows a waveform of a data signal that is inputted to the ASK modulator in FIG. 5.
Figure 6C:
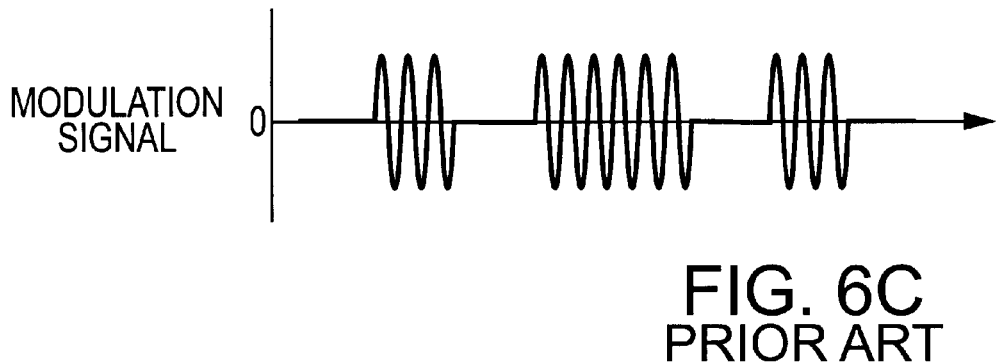
FIG. 6C shows a waveform of a modulation signal that is outputted from the ASK modulator in FIG. 5.

FIG. 1 show an embodiment of an ASK modulator of the present invention. In FIG. 1, portions that are the same as or equivalent to those in FIG. 5 are given the same symbols, and descriptions thereof are omitted.

In FIG. 1, in an ASK modulator 20, a source-voltage switching circuit 21 is connected to the source of an FET 2. The source-voltage switching circuit 21 is configured of a positive-voltage power source 22 and a switch 23 for switching whether or not to apply a voltage generated by the positive-voltage power source 22 to the source of the FET 2. Here, an output voltage of the positive-voltage power source 22 is a positive voltage greater than an absolute value of a pinch-off voltage of the FET 2. Also, the switch 23 is configured so that its operation is associated with a data signal inputted to a data-signal input terminal 10. The switch 23 becomes nonconductive when the data signal is at an H level, and becomes conductive when the data signal is at an L level.

Figure 2A:
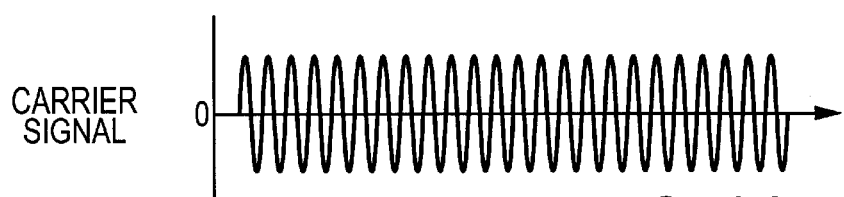
FIG. 2A shows a waveform of a carrier signal that is inputted to the ASK modulator in FIG. 1.
Figure 2B:
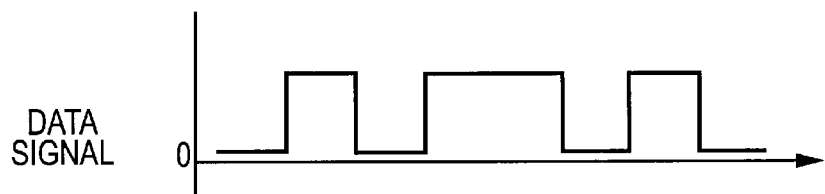
FIG. 2B shows a waveform of a data signal that is inputted to the ASK modulator in FIG. 1.
Figure 2C:
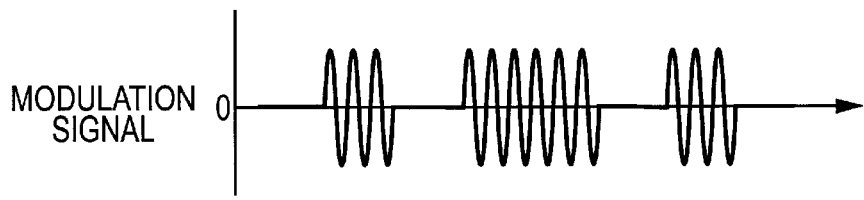
FIG. 2C shows a waveform of a modulation signal that is outputted from the ASK modulator in FIG. 1.

FIGS. 2A to 2C show waveforms of signals that are inputted to the carrier-signal input terminal 9 and the data-signal input terminal 10 and a waveform of a signal that is outputted from the modulation-signal output terminal 6. Hereinbelow, referring to these and other drawings, a description will be given of the operation of the ASK modulator.

First, a carrier signal of a sine wave as shown in FIG. 2A is inputted from the carrier-signal input terminal 9. This is the same as in the case of the ASK modulator 1. On the other hand, a digital data signal as shown in FIG. 2B is inputted from the data-signal input terminal 10. Here, the potential of the data signal is, for example, 5 V at a high (H) level, and is, for example, 0 V at a low (L) level. That is, the data signal is created by the positive-voltage power source. As a result, the data signal with which the carrier signal is overlapped is inputted to the gate of the FET 2.

When the data signal is at the H level, since the switch 23 of the source-voltage switching circuit 21 is nonconductive, voltage of the positive-voltage power source 22 is not applied to the source of the FET 2. Therefore, the voltage between the gate and source of the FET 2 is higher than the pinch-off voltage, the FET 2 performs the amplifying operation, and the amplified carrier signal is outputted from the modulation-signal output terminal 6.

In contrast, when the data signal is at the L level, since the switch 23 of the source-voltage switching circuit 21 is conductive, voltage of the positive-voltage power source 22 is applied to the source of the FET 2. In this case, since the data signal at the L level is substantially at 0 V, the voltage between the gate and the source of the FET 2 is lower than the pinch-off voltage. Therefore, the FET 2 does not perform the amplifying operation, and no signal is outputted from the modulation-signal output terminal 6.

Thus, as shown in FIG. 2C, an ASK-modulation signal in which the carrier signal amplified in relation to whether the data signal exists or does not exist is outputted from the modulation-signal output terminal 6. In this way, ASK modulation is achieved with the ASK modulator 20 without using the negative-voltage power source.

In addition, the positive-voltage power source 22 can also be used as the power source that supplies voltage to the power-source terminal 4.

Referring again to the switch 23 in the ASK modulator 20, it has been described as a mechanical switch. However, the switch 23 may be an electronic switch using a transistor such as a FET.

Figure 3:
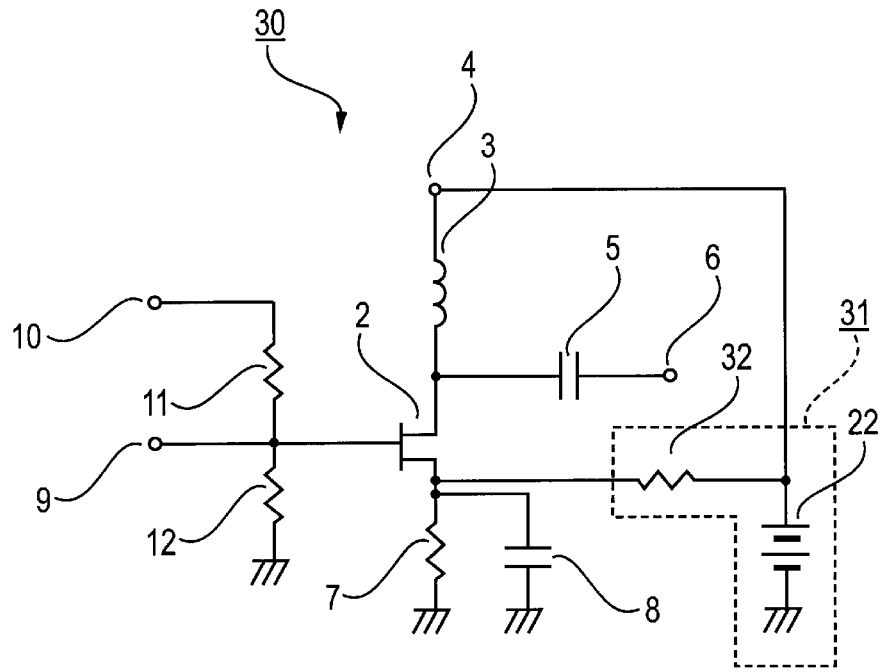
FIG. 3 is a circuit diagram showing another embodiment of an ASK modulator according to the present invention.

FIG. 3 shows another embodiment of an ASK modulator according to the present invention. In FIG. 3, portions that are the same as or equivalent to those in FIG. 1 are given the same symbols, and descriptions thereof are omitted.

In FIG. 3, in an ASK modulator 30, a second resistor 32 is provided instead of the switch 23 used in the above described embodiment. A positive-voltage power source 22 and the second resistor 32 constitute a source-voltage switching circuit 31. Also, the power-source terminal 4 is connected to the positive-voltage power source 22.

To describe the operation of the ASK modulator 30, power-source voltages and resistances are assumed to be as follows. The voltage generated by the positive-voltage power source 22 is 5 V. The resistor 7 has a resistance of 0.3 kΩ, the resistor 11 has a resistance of 4 kΩ, the resistor 12 has a resistance of 6 kΩ, and the resistor 32 has a resistance of 1 kW. The data signal is assumed to have a voltage of 5 V at the H level and a voltage 0 V at the L level. Also, the pinch-off voltage of the FET 2 is assumed to be −1 V.

Hereinbelow, a description will be given of operations of the ASK modulator 30 configured as described above.

First, when the data signal is at the H level, the voltage of 5V of the data signal is divided by the resistor 11 and the resistor 12 to be 3 V. The resultant voltage is overlapped with a carrier signal, and the overlapped voltage is applied to the gate the FET 2. On the other hand, the voltage of 5V of the positive-voltage power source 22 is divided by the second resistor 32 and the resistor 7 to be about 1.15 V, and the resultant voltage is applied the source of the FET 2. At this time, the voltage between the gate and the source of the FET 2 is at 1.85 V which is higher than the pinch-off voltage of −1 V. This causes the FET 2 to perform an amplifying operation and to output the carrier signal amplified thereby. At this time, the source voltage while the FET 2 performs the amplifying operation is about 2.7 V, and the voltage between the gate and the source is 0.3 V.

In contrast, when the data signal is at the L level, the voltage of 0V with which a carrier signal is overlapped is applied to the gate of the FET 2. On the other hand, the voltage of 5 V of the positive-voltage power source 22 is divided by the second resistor 32 and the resistor 7 to be about 1.15 V, and the resultant voltage is applied to the source of the FET 2. Therefore, the voltage between the gate and the source of the FET 2 is −1.15 V which is lower than the pinch-off voltage of −1 V. For this reason, the FET 2 does not perform the amplifying operation, and nothing is outputted from the modulation-signal output terminal 6. In this way, an ASK-modulation signal in which the carrier signal is amplified in relation to whether the data signal exists or does not exist is outputted from the modulation-signal output terminal 6.

As described above, the ASK modulation can be achieved with the ASK modulator 20 without using the negative-voltage power source. Also, the source-voltage switching circuit 31 can be configured of a single unit of the second resistor 32 and a single unit of the positive-voltage power source 22. In addition, the positive-voltage power source 22 can also be used as the power source that supplies voltage to the power-source terminal 4. Therefore, the positive-voltage power source 22 may be configured such that substantially only a single unit, namely the second resistor 32, is added to the conventional ASK modulator 1 (described above in "Description of the Related Art"). As a result, the dimensions and cost of the ASK modulator 30 and a module including it can be further reduced.

Figure 4:
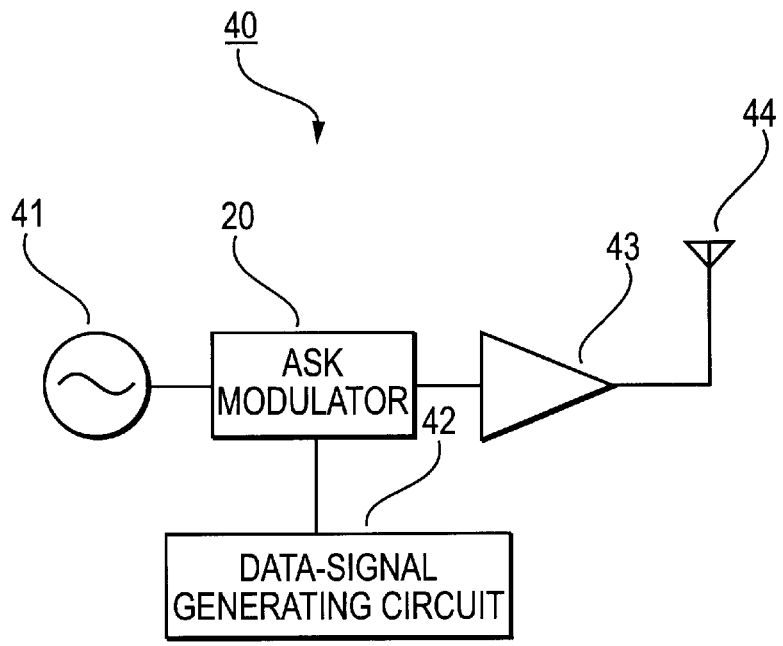
FIG. 4 is a schematic view showing an embodiment of a communication device according to the present invention.

FIG. 4 shows an embodiment of a communication device using the ASK modulator of the present invention. In FIG. 4, a communication device 40 is configured of the following components. They are the ASK modulator 20, an oscillator 41 connected to the carrier-signal input terminal of the ASK modulator 20, a data-signal generating circuit 42 connected to the data-signal input terminal, an amplifier 43, and an antenna 44 connected to an output of the amplifier 43.

In the communication device 40, the ASK modulator 20 uses a data signal inputted from the data-signal generating circuit 42, thereby applying ASK modulation to the carrier signal inputted from the oscillator 41. Then, the amplifier 43 amplifies the modulation signal and radiates the amplified modulation signal as a radio wave.

In this way, the communication device 40 uses the ASK modulator 20 that is small and cheap, thereby allowing miniaturization and cost reduction to be implemented.

Although the ASK modulator 20 is used in the communication device 40, the ASK modulator 30 also may be used so as to provide advantages similar to the case where the ASK modulator 20 is used.

Above, the present invention has been described with reference to what are presently considered to be the preferred embodiments. However, it is to be understood that the invention is not restricted to the described embodiments and modifications. On the contrary, the invention is intended to cover various other modifications and equivalent arrangements included within the spirit and scope of the invention.

What is claimed is:

1. An ASK modulator comprising:
   an FET having a negative pinch-off voltage,
   a carrier-signal input terminal and a data-signal input terminal that are connected to the gate of the FET,
   a modulation-signal output terminal connected to the drain of the FET,
   a resistor connected between the source and ground, and
   a source-voltage switching circuit that is connected to the source of the FET and applies a positive voltage to the source of the FET when the data signal is at an L level.

2. The ASK modulator according to claim 1, wherein said source-voltage switching circuit is additionally connected for applying a positive voltage to the drain of the FET.

3. The ASK modulator according to claim 1, wherein said source-voltage switching circuit comprises:
   a positive-voltage power source; and
   a switching device which is configured so as to apply said positive voltage to the source substantially only when the data signal is at said L level.

4. The ASK modulator according to claim 3, wherein said source-voltage switching circuit is additionally connected for applying a positive voltage to the drain of the FET.

5. The ASK modulator according to claim 1, wherein the source-voltage switching circuit comprises:
   a positive-voltage power source; and
   a second resistor connected between the positive-voltage power source and the source of the FET.

6. The ASK modulator according to claim 5, wherein said source-voltage switching circuit is additionally connected for applying a positive voltage to the drain of the FET.

7. A communication device comprising:
   the ASK modulator according to one of claims 1, 3 and 5;
   a carrier signal source connected to said carrier-signal input terminal; and
   a data signal source connected to said data-signal input terminal.

8. The communication device according to claim 7, further comprising an amplifier which receives an output of said ASK modulator, and an antenna terminal which receives an output of said amplifier.

9. The communication device according to claim 8, further comprising an antenna attached to said antenna terminal.

* * * * *